United States Patent [19]

Ogden

[11] Patent Number: 5,624,700
[45] Date of Patent: Apr. 29, 1997

[54] PROCESS TO PRODUCE CARBONATED SEMI-SOLID OR SOLID FOOD AND THE PRODUCT THEREOF

[75] Inventor: Lynn V. Ogden, Provo, Utah

[73] Assignee: Brighan Younf University, Provo, Utah

[21] Appl. No.: 354,475

[22] Filed: Dec. 12, 1994

[51] Int. Cl.$^6$ ............... A23G 9/06; A23C 9/13
[52] U.S. Cl. ............ 426/564; 426/565; 426/576; 426/579; 426/583; 426/477
[58] Field of Search .................. 426/565, 566, 426/567, 583, 579, 576, 477

[56] References Cited

U.S. PATENT DOCUMENTS

| | | | |
|---|---|---|---|
| 3,256,100 | 6/1966 | Bernstein | 426/565 |
| 3,291,076 | 12/1966 | Flanigan et al. | 426/565 |
| 3,503,757 | 3/1970 | Rubenstein | 426/565 |
| 3,761,285 | 9/1973 | Nagasawa et al. | 426/565 |
| 3,826,829 | 7/1974 | Marulich | 426/565 |
| 3,959,513 | 5/1976 | Strobach et al. | 426/565 |
| 4,206,244 | 6/1980 | Schenk | 426/583 |
| 4,452,823 | 6/1984 | Connolly et al. | 426/565 |
| 4,659,575 | 4/1987 | Fiedler | 426/565 |
| 4,676,988 | 6/1987 | Efstathiou et al. | 426/271 |
| 4,804,552 | 2/1989 | Ahmed et al. | 426/580 |
| 4,919,960 | 4/1990 | Ahmed et al. | 426/580 |

FOREIGN PATENT DOCUMENTS

| | | |
|---|---|---|
| 1143211 | 3/1983 | Canada. |
| 0117011 | 8/1984 | European Pat. Off.. |
| 51-0228161 | 2/1976 | Japan. |
| 57-206333 | 12/1982 | Japan. |
| 63-141544 | 6/1988 | Japan. |
| 63-263045 | 10/1988 | Japan. |
| 63-263044 | 10/1988 | Japan. |
| 1-67150 | 3/1989 | Japan. |
| 625677 | 9/1978 | U.S.S.R.. |
| 364657 | 1/1932 | United Kingdom. |
| 1005399 | 8/1965 | United Kingdom. |
| 89/02221 | 3/1989 | WIPO. |

OTHER PUBLICATIONS

H.S. Choi et al., "Sweet Plain and Flavored Carbonated Yogurt Beverages," *Journal of Dairy Science*, vol. 68, pp. 613–619 (1985).

D.L. Barnes et al., "Effect of Selected Stabilizing and Buffering Agents on a Sweetened, Acidified, Carbonated Milk Beverage", *Cultured Dairy Products Journal*, pp. 21–25, (Aug. 1992).

*Primary Examiner*—Jeanette Hunter
*Attorney, Agent, or Firm*—Phillips, Moore, Lempio & Finley

[57] ABSTRACT

A process to add carbon dioxide under low shear conditions to an already formed food to produce a semi-solid or solid carbonated food. The carbonated semi-solid or solid spoonable food has the following properties:
(a) a viscosity of between about 2000 and 200,000 centipoise at between about 1.5° and 25° C., and
(b) a carbonation level of between about 0.5 and 4.0 volumes of carbon dioxide per volume of food. The process includes contacting the formed food with carbon dioxide gas with low shear agitation.

26 Claims, 1 Drawing Sheet

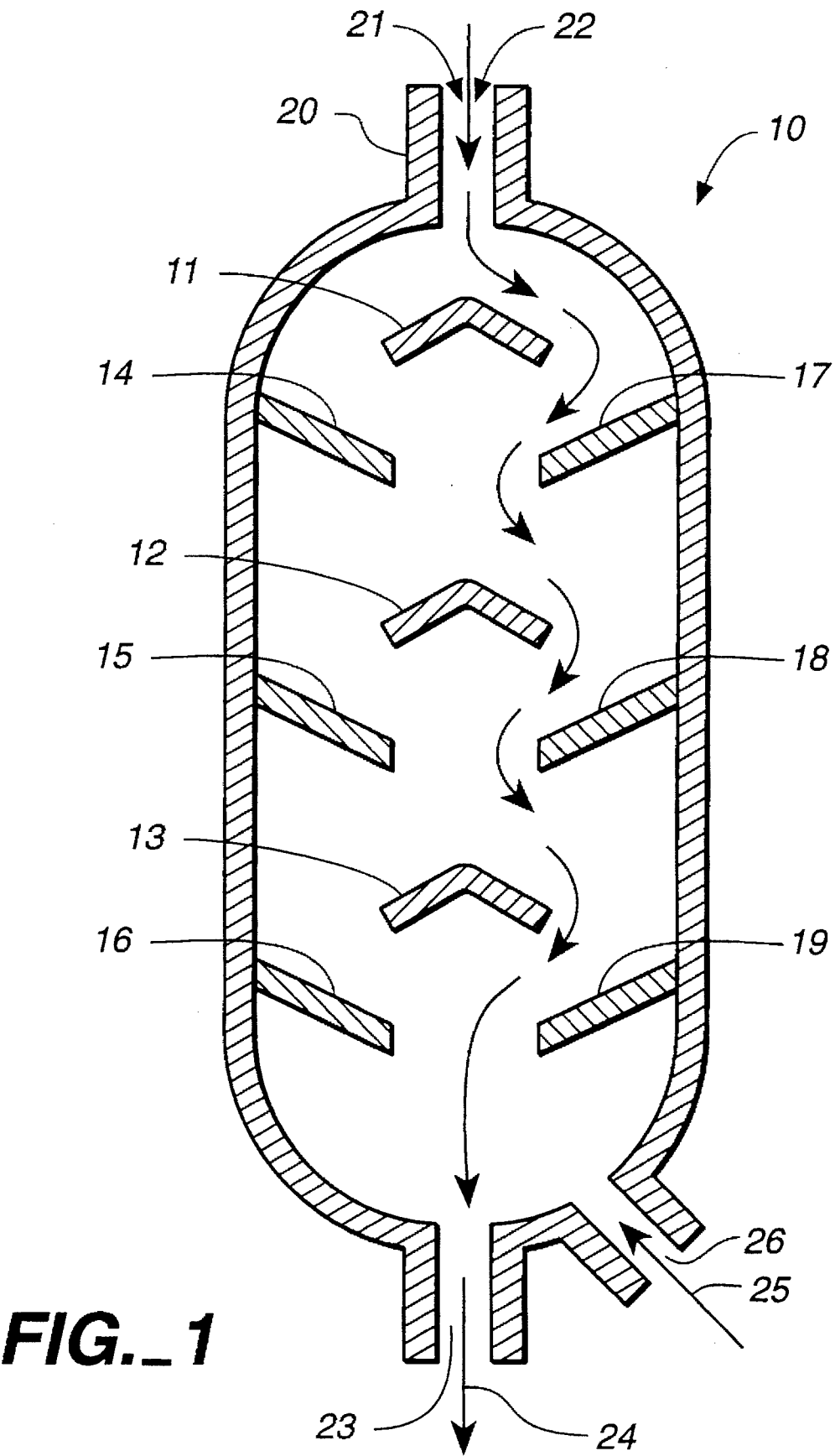
FIG._1

PROCESS TO PRODUCE CARBONATED SEMI-SOLID OR SOLID FOOD AND THE PRODUCT THEREOF

BACKGROUND OF THE INVENTION

1. Field of the Invention

The present invention relates to carbonated solid or semi-solid food (e.g., gelatin, pudding, custard, yogurt) that can be eaten using a spoon or other utensil. The invention also relates to a method of carbonating an already formed food under mild conditions which do not destroy the solid or semi-solid properties of the gelled food, preferably yogurt.

2. Description of the Problem and Related Art

Presently carbonated semi-solid or solid foods (e.g. yogurt) are made by one or more complex processes in which the components (before mixing or fermentation) rather than the final product are carbonated. Some semi-solid foods can be carbonated in their final form, but carbonation using carbon dioxide requires additional production equipment. At the present, only liquids are carbonated using carbon dioxide in their final form. Therefore, the food industry does not yet produce carbonated semi-solid or solid foods in significant amounts. Consumer acceptance testing in this field demonstrates that such foods have the potential for successful commercialization.

A useful semi-solid or solid food (e.g. yogurt, custard, pudding, gelatin) product having desirable levels of carbonation has been elusive. Previous methods for carbonating yogurt include for example, adding carbonated water to a yogurt; manufacturing a liquid, drinkable yogurt by existing commercial processes for carbonating liquids; and a method for producing a powdered, drinkable liquid yogurt by adding metal carbonates to a powdered yogurt mix. Specific references are presented and discussed below.

None of the existing methods are suitable for making a highly viscous solid or semi-solid food product having the desired levels of carbonation. All of these processes result in either a product having sufficient levels of carbonation and low viscosity, or a product having the desired viscosity, but low levels of carbonation.

The previous processes do not teach one skilled in the art concerning how to select the temperature, pressure, surface area, agitation, etc. ranges which are best for carbonating semi-solid, solid, or otherwise highly viscous foods. No process has been disclosed which would allow manufacturers of dairy and other semi-solid or solid food products to use existing carbonation equipment or machinery with only slight modifications or additions.

The following patents and articles are of general and specific interest.

I. Rubenstein, in U.S. Pat. No. 3,503,757, discloses a method of making a frozen confection and in a treatment zone by contacting it with multiple finely divided streams of gaseous carbon dioxide followed by freezing the mix.

R. U. Schenk, in U.S. Pat. No. 4,206,224, discloses dry mix to be combined with water to produce a carbonated liquid yogurt.

J. D. Efstathiou et al., in U.S. Pat. No. 4,676,988, disclose the carbonation of milk to produce a low acid carbonated liquid milk product (a beverage).

S. H. Ahmad et al., in U.S. Pat. No. 4,804,552, disclose a method for carbonating a liquid dairy product. The liquid dairy product is heated at 160° F. for up to 30 minutes to denature the protein present. This liquid is then treated with volumes of pressurized gaseous carbon dioxide.

S. H. Ahmad et al., in U.S. Pat. No. 4,919,960, disclose a process for making a carbonated liquid dairy product. The food is heated between 160° F. and 200° F. for 5 seconds to 30 min followed by gaseous carbon dioxide treatment.

R. Mack, in UK Patent 364,657, discloses a method for producing effervescent refreshing drinks using liquid milk. The carbon dioxide gas is bubbled through the milk.

UK Patent 1,005,399, assigned to American Machine and Foundry, discloses a method of enhancing flavor of chilled or frozen dairy desserts such as soft ice cream et al. by incorporation of controlled amounts of carbon dioxide, and also the unique products that result from the process. The level of carbon dioxide used is sufficient to lower the pH value of the mixture.

E. Yeghiaian, in Canadian Patent 1,143,111, discloses a formulation of a mixture of sour yogurt from cow's milk in water and carbonated to make new liquid beverage.

P. H. J. M. Evers, in European Patent Publication D117 011, discloses the introduction of gaseous carbon dioxide to a fermented milk such as yogurt to produce a beverage that can be stored for a long period of time.

M. A. Tracy, in World Patent Publication WO 89/02221, discloses the contacting of a carbon dioxide gas or a mixture of gases with a liquid milk product at a low temperature of less than 10° C. and high pressure from 50 kpa to 200 kpa. The liquid carbonated milk product retains its carbonation until opened.

Soviet Union Patent SU 625 677, discloses a gassed whey drink prepared by heating, cooling, clarifying, flavoring and a specific two stage carbon dioxide treatment.

Japanese Patent Publication 51-022861, discloses a carbonic milk beverage which is fermented followed by addition of carbon dioxide.

Japanese Patent Publication 57-206 333, discloses a preparation for a thick liquid fermented milk containing carbon dioxide gas and nonfat milk solids.

Japanese Patent Publication 63-141544, discloses a process of carrying out the fermentation of a milk mix. The fermented milk contains carbon dioxide gas and has a mild and fresh taste and a smooth texture and improved storage at low temperature.

Japanese Patent Publication 63-263044, discloses a method of adding a gelling agent and bacteria to milk, fermenting the milk to a product having a carbon dioxide content 0.1 to 0.2 weight/volume percent.

Japanese Patent Publication 63-263045, disclose a milk fermented in a bed and homogenized in a chilled state. This product is mixed with aqueous pectin and carbon dioxide gas.

Japanese Patent 64-67150, discloses a process to combine carbon dioxide gas in milk, etc. in the presence of lactic acid to obtain a solid yogurt having a uniform level of carbon dioxide gas.

H. S. Choi et al., in *Journal of Dairy Science*, Vol. 68, pgs. 613–619, published in 1985, discloses a method of preparation of sweetened and plain carbonated yogurt beverages.

D. L. Barnes et al., in *Cultured Dairy Products Journal*, p. 21–25, published in August 1992, disclose the effect of buffering agents on a sweetened acidified carbonated milk liquid beverage.

None of these patents or publications individually or separately teach or suggest the present invention.

All patents, publications, articles, references, standards, and the like cited in this application are incorporated by reference in their entirety.

Based on the above discussion, it is apparent there remains a need for a new process to produce a solid or semi-solid spoonable food, e.g., yogurt, which is carbonated to high levels of carbon dioxide. Also, the food having the high level of carbon dioxide has special physical, chemical and taste properties. The presently claimed process and food product fulfills these needs.

SUMMARY OF THE INVENTION

The present invention relates to a carbonated semi-solid spoonable food having the following properties:

(a) a viscosity of between about 2000 and 200,000 centipoise (cp) at between about 1.5° and 25° C., and (b) a carbonation level of between about 0.5 and 4.0 volumes of carbon dioxide. Preferred foods include yogurt, pudding, gelatin, custard, ice cream mix, and the like. Already fermented yogurt is more preferred.

Another embodiment of the present invention is a process to produce a carbonated thickened semi-solid spoonable food, which process comprises:

A. contacting the food with carbon dioxide gas with low shear agitation at a temperature of between about 8° and 25° C. and carbon dioxide at a pressure of between about 0 and 110 psig for between 1 and 180 min; to produce a carbonated semi-solid thickened food having (a) a viscosity of between about 3000 and 180,000 centipoise at between about 10° and 25° C., and (b) a carbonation level of between about 0.5 and 4.0 volumes of carbon dioxide.

In another embodiment of the process, in step A, the low shear agitation occurs at between about 1 $sec^{-1}$ and 2000 $sec^{-1}$ shear value; and is accomplished by methods selected from one or more of the following operations:

(i) shaking the food in carbon dioxide;

(ii) churning the food in carbon dioxide;

(iii) pumping the food in carbon dioxide;

(iv) pumping the food through baffles in carbon dioxide;

(v) bubbling gaseous carbon dioxide through the food under pressure;

(vi) bubbling gaseous carbon dioxide through the food using solid carbon dioxide with sublimation.

In still another embodiment, the present invention relates to the carbonated semi-solid or solid spoonable food produced by the described processes.

BRIEF DESCRIPTION OF THE DRAWINGS

FIG. 1 is a cross-sectional schematic representation of a reaction vessel containing baffles.

DETAILED DESCRIPTION OF THE INVENTION AND PREFERRED EMBODIMENTS

As used herein:

"Food" refers to solid or semi-solid food, usually in its final form.

More preferred foods include yogurt, custard, gelatin, ice cream and its mixture of components, pudding and the like. Dairy products or gelatin (e.g. Jello® a trademark of General Foods) are preferred.

"Yogurt" refers to conventional cultured yogurt.

The agitation or mixing to obtain the proper degree of carbon dioxide level in the yogurt is obtained by a number of methods. Yogurt is used below but it is understood that it can be any food as food is defined herein. The methods include but are not limited to:

Low Shear Agitation in Gaseous Carbon Dioxide

The mixture of yogurt and carbon dioxide is agitated in a conventional mixer or in conventional mixer which is modified to retain the pressure of the carbon dioxide, e.g., a Groen stainless steel kettle. It is important that the agitation occur at low shear, e.g., between about 1 and 1000 $sec^{-1}$, preferably between about 5 and 40 $sec^{-1}$. If the shear rate is too high, i.e., higher than 10,000 or 100,000 $sec^{-1}$, then the structure of the food gel is broken and the final product will not assume a solid or semi solids state suitable for spooning.

The temperature of the mixture during agitation is between about 5° C. and 20° C., preferably between about 10° C. and 18° C., more preferably about 13° C. The reaction vessel containing the yogurt is deaerated then pressurized with gaseous food grade carbon dioxide at between about 5 psig and 150 psig, preferably between about 70 psig and 110 psig, more preferably about 90 psig, ±10 psig. The agitation is continued at a rate of about 10 to 100 rpm, preferably about 30 to 60 rpm, for about 20 to 120 min., preferably about 30 to 90 min., more preferably about 60 min. After reaction, the gaseous carbon dioxide is removed after packaging and cooling, the yogurt obtained exhibits solid spoonable properties and has a carbon dioxide content of between 0.5 and 3 volumes, preferably about 2 volumes per weight of yogurt. It is to be understood that at higher mixing temperatures generally less carbon dioxide is retained by the yogurt.

Churning in Gaseous Carbon Dioxide

The mixture of yogurt and gaseous carbon dioxide are thoroughly mixed by churning. Many churns are available commercially or may be adapted when necessary to retain the pressure of the carbon dioxide. The pressures, temperatures, mixing times, and the volumes of carbon dioxide retained generally the same as described above for Low Shear Agitation in Gaseous Carbon Dioxide.

Pumping Through Piping in Gaseous Carbon Dioxide

The mixture of yogurt and gaseous carbon dioxide are thoroughly mixed by being pumped through a series of cooled pipes. The configuration of the piping system is not important, except that the shear rate cannot be high enough to destroy the gelling properties of the yogurt. A conventional commercial ice cream freezer having a barrel about 50–150 cm long, preferably about 100 cm ±20 cm is used. The yogurt is contacted with excess gaseous carbon dioxide at a pressure of between about 5 psig and 50 psig and an effective residence time of 0.5 to 5 min., preferably about 1.0 and 2 min. The temperatures ranges and pressure ranges are about the same as described above. The product is obtained having carbon dioxide of content between about 0.5 and 3 volumes, preferably about 2 volumes. The carbon dioxide containing product has the desired spoonable properties.

Pumping Through Baffles in Gaseous Carbon Dioxide

This process to produce the carbon dioxide/yogurt mixture is a variation of the pumping through pipes. As is seen in FIG. 1, a metal, glass or ceramic reactor 10 having internal baffles 11–19 is used to provide mixing and increased contact of the carbon dioxide and yogurt. The yogurt 22 enters reactor 10 via pipe 20 and opening 21. In one embodiment, the gaseous carbon dioxide simultaneously enters the reactor via opening 21 and proceeds through reactor 10 as shown by the curved arrows, and the yogurt/carbon dioxide 24 mixture exits at opening 23. This configuration produces co-current flow.

In another embodiment (not shown), a separate inlet for the carbon dioxide gas under pressure is provided in the reactor at the top immediately adjacent to the inlet 21. This configuration will also produce co-current flow.

In another embodiment, the gaseous carbon dioxide 25 can enter under pressure through an opening 26 near to opening 23. A countercurrent flow is created. The size of the reactor, the size, number and configuration of the baffles is established by one of skill in this art. It is possible to use two or more such reactors in series or in parallel to produce the desired carbon dioxide level and throughput of the product. It is also possible to recycle product through same the ranges of temperatures, pressures, ratios, etc. are similar to those described above.

Bubbling Gaseous Carbon Dioxide Under Pressure

In another embodiment, the carbonated yogurt is obtained by bubbly gaseous carbon dioxide through the yogurt. The temperatures, agitation, etc. are described above. Usually carbon dioxide at about 60 psig pressure is bubbled through the yogurt wherein the yogurt is at ambient pressure. While making a 50 kg batch flow rate of carbon dioxide used is between about 10 and 200 g/min., preferably, between about 50 and 200 g/min., and preferably about 100 g/min. The yogurt/carbon dioxide mixture obtained is comparable to that produced by the above-described processes.

Bubbling Gaseous Carbon Dioxide Using Solid Carbon Dioxide

The cultured yogurt is placed in a reactor of useful shape and dimensions. Excess solid carbon dioxide is added to the reactor and the system is held at between 5° C. and 20° C., preferably about 13±3° C. for between about 5 and 60 min. The pressure builds-up to about 60 psig. The carbon dioxide is sublimed and bubbles-up in the yogurt. After the reaction, the excess carbon dioxide is vented, and the spoonable carbonated yogurt having a carbon dioxide content of between about 0.3 and 4 volumes is obtained.

The viscosity of the carbonated food is usually about 2,000 and 200,000 centipoise at between about 1.5° and 25° C. A preferred viscosity is between about 5,000 and 100,000 centipoise at between about 5° and 20° C. A more preferred viscosity is between about 5,000 and 50,000 centipoise at between about 5° and 20° C.

The viscosity of the carbonated yogurt is usually about 2,000 and 200,000 centipoise at between about 1.5° and 25° C. A preferred viscosity is between about 5,000 and 100,000 centipoise at between about 5° and 20° C. A more preferred viscosity is between about 5,000 and 50,000 centipoise at between about 5° and 20° C.

The viscosity of the gelatin at the time of carbonation is usually about 2,000 and 200,000 centipoise at between about 1.5° and 25° C. A preferred viscosity is between about 5,000 and 100,000 centipoise at between about 13° and 20° C. A more preferred viscosity is between about 5,000 and 50,000 centipoise at between about 5° and 20° C. The gelatin solution will gel upon chilling after carbonation.

When the food is ice cream, ice cream mix, or custard the viscosity is comparable to that described above for pudding.

Other ingredients may be added to the yogurt to suit various tastes. Among those ingredients are sweeteners, flavorings, and thickeners.

Yogurt sweeteners, if used, are either nutritive sweeteners or non-nutritive sweeteners. If nutritive sweeteners are used, they may comprise from about 5% to 15% of the total weight of the yogurt. The yogurt industry generally uses about 12% (by weight) nutritive sweeteners in yogurt production. If non-nutritive sweeteners are used, any amount may be used to achieve the desired sweetness.

Any flavorings e.g. fruit, chocolate, vanilla and the like may be used. Those chosen and the amounts used are entirely up to the manufacturers and the consumer's tastes. However, the amounts of flavoring used generally do not exceed 25% of the total weight of the yogurt.

Thickeners are generally chosen from the group consisting of gelatin, starch, gum, and the nonfat milk solids. The gums can be either added or produced while culturing the yogurt. Any one, or any combination of the above thickeners may be used, the amounts and combinations of which are a matter of the manufacturers' and consumers' tastes. The types of thickeners and the amounts used also determine the final viscosity of the carbonated yogurt.

The following Examples are provided to be descriptive and illustrative only. They are not meant to be construed to be limiting in any way or fashion.

EXAMPLE 1

Low Shear Agitation (a) Yogurt (100 kg) which has been produced by fermentation according to R. C. Chandan (1993) yogurt in *Dairy Science and Technology Handbook*, (Y. H. Hui ed.), VCH Publishers, Inc., New York, pp. 22–35. is cooled to 13° C. The yogurt is then placed in a modified Groen stainless steel kettle having a cylindrical shape and a hemispheric bottom with a gasketed lid which holds pressure when sealed having a scraped surface agitator in the shape of circle at a temperature of about 13° C.±1° F. The reaction vessel is deaerated then pressurized with gaseous carbon dioxide of about 90 psig and agitated at a rate of 40 rpm for 60 min. The carbon dioxide is vented. The carbonated solid spoonable yogurt containing 2.0 volume $CO_2$.

(b) Similarly, the reaction of Example (1a) is repeated except that the temperature is about 10° C.±1° C. and the pressure is about 150 psig, with the result that a solid yogurt is obtained having a useful carbon dioxide content of about 3.0 volumes.

(c) Similarly, the reaction of Example (1a) is repeated except that the temperature is about 18° C.±1° C. and the pressure is about 5 psig, with the result that a solid yogurt is obtained having a useful carbon dioxide content of about 0.5 volume $CO_2$.

(d) Similarly, the reaction of Examples (1a), (1b) or (1c) are repeated except that the yogurt is replaced with an equivalent volume of gelatin, pudding, custard, ice cream mix, or ice cream. The result is that a solid gelatin, pudding, custard or ice cream is obtained having a useful carbon dioxide content of about the level and at the temperatures observed for the yogurt.

EXAMPLE 2

Churning in Carbon Dioxide (a) Yogurt (100 kg) which has been produced by fermentation according to R. C. Chandan (1993) "above", is cooled to 13° C. The yogurt is placed in a conventional butter churn at 13° C.±2° C. The churn is pressurized with carbon dioxide at 13° C. about 30 psig, and the mixture is churned for 60 min. at 13° C. The excess carbon dioxide is vented. The carbonated solid spoonable yogurt has a carbon dioxide content of 1.5 volumes.

(b) Similarly, the reaction of Example (2a) is repeated except that the temperature is about 8° C.±1° C. and the pressure is about 50 psig, with the result that a solid yogurt is obtained having a useful carbon dioxide content of about 2.0 volume.

(c) Similarly, the reaction of Example (2a) is repeated except that the temperature is about 18° C.±1° C. and the pressure is about 2 psig, with the result that a solid yogurt is obtained having a useful carbon dioxide content of about 0.5 volume.

(d) Similarly, the reaction of Examples (2a), (2b) or (2c) are repeated except that the yogurt is replaced with an equivalent volume of gelatin, pudding, custard, ice cream mix, or ice cream. The result is that a solid gelatin, pudding, custard or ice cream is obtained having a useful carbon dioxide content of about the level and at the temperatures observed for the yogurt.

EXAMPLE 3

Pumping in Carbon Dioxide (a) Yogurt (200 kg) as fermented in Example 2 is cooled to 13° C. The yogurt is then pumped through a continuous ice cream freezer (Crepaco) with 1.0 meter barrel with a 10 cm diameter barrel and refrigeration applied at 13° C.±2° C. at the rate of 20 liter/min injecting $CO_2$ residence time in the barrel is 1.2 min. in the presence of gaseous carbon dioxide at a pressure of 20 psig. The solid spoonable carbonated yogurt is obtained having a carbon dioxide content of 1.0 percent by weight.

(b) Similarly, the reaction of Example (3a) is repeated except that the temperature is about 8° C.±1° C. and the pressure is about 50 psig. The flow rate 5 liter/min having a residence time of 2 min. The result is that a solid yogurt is obtained having a useful carbon dioxide content of about 2.0 volumes.

(c) Similarly, the reaction of Example (3a) is repeated except that the temperature is about 18° C.±1° C. and the pressure is about 5 psig. The flow rate of 20 liter/min having a residence time of 30 seconds. The result is a solid yogurt having a useful carbon dioxide content of about 0.5 volumes.

(d) Similarly, the reaction of Examples (3a), (3b) or (3c) are repeated except that the yogurt is replaced with an equivalent volume of gelatin, pudding, custard, ice cream mix, or ice cream. The result is that a solid gelatin, pudding, custard or ice cream is obtained having a useful carbon dioxide content of about the level and at the temperatures observed for the yogurt.

EXAMPLE 4

Pumping Through Baffles in Carbon Dioxide

Yogurt (100 kg) as fermented in Example 2 is cooled to 13° C. The yogurt is then pumped over stationary baffles in the shape of cylinder (see FIG. 1) or as described at 13° C.±2° C. The yogurt is pumped through the baffles the presence of gaseous carbon dioxide at a pressure of 90 psig at 13° C. for 30 min. The solid spoonable carbonated yogurt is obtained having a carbon dioxide content of 2.5 volumes.

(b) Similarly, the reaction of Example (4a) is repeated except that the temperature is about 8° C.±1° C., the time is about 60 mins., and the pressure is about 150 psig. The result is that solid yogurt is obtained having a useful carbon dioxide content of about 3 volumes.

(c) Similarly, the reaction of Example (4a) is repeated except that the temperature is about 18° C.±1° C., the time is 5 mins., and the pressure is about 5 psig. The result is that a solid yogurt is obtained having a useful carbon dioxide content of about 0.5 volumes.

(d) Similarly, the reaction of Examples (4a), (4b) or (4c) are repeated except that the yogurt is replaced with an equivalent volume of gelatin, pudding, custard, ice cream mix, or ice cream. The result is that a solid gelatin, pudding, custard or ice cream is obtained having a useful carbon dioxide content of about the level and at the temperatures observed for the yogurt.

EXAMPLE 5

Gaseous Carbon Dioxide Bubbling

Yogurt (100 kg) as fermented in Example 2 is stored at 13° C. The yogurt is then placed in a reactor system in the shape of cylinder at 13°±2° C.±2° C. The yogurt by bubbling gaseous carbon dioxide at a flow rate of 100 g/min. under 60 psi pressure at 13° C. for 30 min. The solid spoonable carbonated yogurt is obtained having a carbon dioxide content of 2.0 volumes.

(b) Similarly, the reaction of Example (5a) is repeated except that the temperature is about 8° C.±1° C., the pressure is 90 psig, at a flow rate of 200 g/min., with the result that a solid yogurt is obtained having a useful carbon dioxide content of about 3.0 volumes.

(c) Similarly, the reaction of Example (5a) is repeated except that the temperature is about 18° C.±1° C., the pressure is ambient pressure, and the flow rate of 50 g/min. with the result that a solid yogurt is obtained having a useful carbon dioxide content of about 0.5 volumes.

(d) Similarly, the reaction of Examples (5a), (5b) or (5c) are repeated except that the yogurt is replaced with an equivalent volume of gelatin, pudding, custard, or ice cream. The result is that a solid gelatin, pudding, custard or ice cream is obtained having a useful carbon dioxide content of about the level and at the temperatures observed for the yogurt.

EXAMPLE 6

Solid Carbon Dioxide with Bubbling

Yogurt (100 kg) as fermented in Example 2 is cooled at 13° C. The yogurt is then placed in a reactor system in the shape of cylinder 13° C.±2° C. Solid carbon dioxide (5 kg) is added. The yogurt in the presence of solid carbon dioxide is held at 13° C. for 30 min. The carbon dioxide sublimes and bubbles through the yogurt. The pressure is allowed to build-up to about 60 psig. The solid spoonable carbonated yogurt is obtained having a carbon dioxide content of 2.0 volumes.

(b) Similarly, the reaction of Example (6a) is repeated except that the temperature is about 8° C.±1° C. The pressure is allowed to build-up to 120 psig. The resulting a solid yogurt is obtained having a useful carbon dioxide content of about 3.0 volumes.

(c) Similarly, the reaction of Example (6a) is repeated except that the temperature is about 18° C.±1° C. The vessel is not pressurized and exposure time is 5 min. The result is that a solid yogurt is obtained having a useful carbon dioxide content of about 0.5 volumes.

(d) Similarly, the reaction of Examples (6a), (6b) or (6c) are repeated except that the yogurt is replaced with an equivalent volume of gelatin, pudding, custard, ice cream mix, or ice cream. The result is that a solid gelatin, pudding, custard or ice cream is obtained having a useful carbon dioxide content of about the level and at the temperatures observed for the yogurt.

While only a few general embodiments of the invention have been shown and described herein, it will become apparent to those skilled in the art that various modifications and changes can be made in the addition of carbon dioxide to fermented yogurt and the carbon dioxide containing yogurt, without departing from the spirit and scope of the present invention. All such modifications and changes coming within the scope of the appended claims are intended to be carried out thereby.

I claim:

1. A carbonated semi-solid or solid spoonable food formed by contacting said food with carbon dioxide during low shear agitation having the following properties:
   (a) a viscosity of between about 2000 and 200,000 centipoise at between about 1.5° and 25° C., and
   (b) a carbonation level of between about 0.5 and 4.0 volumes of carbon dioxide per volume of food.

2. The food of claim 1 wherein the food is independently selected from yogurt, pudding, custard, gelatin or ice cream.

3. The food of claim 2 wherein the food is yogurt, and the low shear agitation is at between about 1 $sec^{-1}$ and 200 $sec^{-1}$ shear value.

4. A process to produce a carbonated thickened semi-solid or solid spoonable food, which process comprises:
   A. contacting the formed food with carbon dioxide gas with low shear agitation at a temperature of between about 8° and 25° C. and a carbon dioxide pressure of between about 0 and 110 psig for between 1 and 180 min, to produce a carbonated solid or semi-solid thickened food having:
   (a) a viscosity of between about 3000 and 180,000 centipoise at between about 10° and 25° C., and
   (b) a carbonation level of between about 0.5 and 4.0 volumes of carbon dioxide per volume of solid or semi-solid food.

5. The process of claim 4 wherein the food is selected from cultured yogurt, custard, gelatin, pudding or ice cream.

6. The process of claim 5 wherein the food is cultured yogurt.

7. The carbonated semi-solid or solid spoonable food produced by the process of claim 4.

8. The carbonated solid or semi-solid spoonable cultured yogurt, custard, gelatin or ice cream produced by the process of claim 5.

9. The carbonated solid or semi-solid cultured yogurt produced by the process of claim 6.

10. The process of claim 4 wherein
    in step A, the low shear agitation occurs at between about 1 $sec^{-1}$ and 200 $sec^{-1}$ shear value; and is accomplished by methods selected from one or more of the following operations:
    (i) shaking the food in carbon dioxide;
    (ii) churning the food in carbon dioxide;
    (iii) pumping the food in carbon dioxide;
    (iv) pumping the food through baffles in carbon dioxide;
    (v) bubbling gaseous carbon dioxide through the food under pressure; or
    (vi) bubbling gaseous carbon dioxide through the food using solid carbon dioxide with sublimation.

11. The carbonated solid or semi-solid spoonable food produced by the process of claim 10.

12. The carbonated spoonable semi-solid or solid cultured yogurt produced by the process of claim 10.

13. The process of claim 10 wherein the method is (i) shaking in carbon dioxide.

14. The carbonated spoonable semi-solid or solid cultured yogurt produced by the process of claim 13.

15. The process of claim 10 wherein the method is (ii) churning in carbon dioxide.

16. The carbonated spoonable semi-solid or solid cultured yogurt produced by the process of claim 15.

17. The process of claim 10 wherein the method is (iii) pumping in carbon dioxide.

18. The carbonated spoonable semi-solid or solid cultured yogurt produced by the process of claim 17.

19. The process of claim 10 wherein the method is (iv) pumping through baffles in carbon dioxide.

20. The carbonated spoonable semi-solid or solid cultured yogurt produced by the process of claim 19.

21. The process of claim 10 wherein the method is (v) bubbling gaseous carbon dioxide through the cultured yogurt under pressure.

22. The carbonated spoonable semi-solid or solid cultured yogurt produced by the process of claim 21.

23. The process of claim 10 wherein the method is (vi) bubbling gaseous carbon dioxide through the cultured yogurt using solid carbon dioxide with sublimation.

24. The carbonated spoonable semi-solid or solid cultured yogurt produced by the process of claim 23.

25. The process of claim 4 wherein the temperature is between about 5° and 22° C., and the pressure of the carbon dioxide is between about 10 and 100 psig.

26. The process of claim 25 wherein the shear rate of the agitation is between about 1 and 2000 $sec^{-1}$.

* * * * *